United States Patent [19]
Forrest et al.

[11] 4,024,911

[45] May 24, 1977

[54] PUMP SHAFT SEAL INJECTION SYSTEM

[75] Inventors: Alan Wayne Forrest, East Hampton, Conn.; James Paul Pelletier, Hatfield, Mass.

[73] Assignee: Combustion Engineering, Inc., Windsor, Conn.

[22] Filed: Mar. 18, 1974

[21] Appl. No.: 452,092

[52] U.S. Cl. .................. 165/107; 176/37; 415/112; 415/176
[51] Int. Cl.² ................................ G21C 19/20
[58] Field of Search ............... 165/36, 47, 48, 61, 165/107; 415/109, 176, 112, 175; 277/3, 15; 176/37

[56] References Cited
UNITED STATES PATENTS 3,651,866   3/1972   Lileg .................... 415/176

Primary Examiner—Charles J. Myhre
Assistant Examiner—Daniel J. O'Connor

[57] ABSTRACT

Apparatus is described for supplying injection liquid to the primary coolant pump shaft seals in a pressurized water nuclear reactor system. The injection liquid is the resultant mixture of liquid extracted from both the upstream and downstream sides respectively of the regenerative heat exchanger in the chemical and volume control system of the plant. The temperature of this liquid is controlled by regulating the liquid proportions admitted in the respective flow streams.

4 Claims, 2 Drawing Figures

PUMP SHAFT SEAL INJECTION SYSTEM

BACKGROUND OF THE DISCLOSURE

The present invention relates to nuclear steam supply systems utilizing pressurized water as the primary coolant. More particularly, the invention relates to an improved organization for supplying high purity seal liquid at controlled temperatures to the shaft seal system of primary coolant pumps utilized in such nuclear steam supply systems.

The pumps employed in nuclear plants of the described type for circulating the primary coolant between the reactor and the steam generators therein are commonly provided wth seal element structures disposed along the pump shafts to prevent the leakage of pumped coolant therealong. It is the practice to provide flow passages in association with such seal element structures by means of which a pressurized liquid is injected into intimate relation with the seal element for cooling the elements and for preventing the accumulation of foreign deposits. Because the liquid that is injected into the shaft seal system is ultimately admitted to the primary coolant circuit and because it is necessary to prevent the inclusion of foreign deposits in the seal structure this fluid must be of high purity. It has accordingly been the practice to utilize for seal injection purposes the processed liquid returning to the primary coolant circuit from the chemical and volume control system of the plant.

As is well known, the chemical and volume control system of nuclear power plants of the described type involve a constant bleed of a portion of the circulating liquid from the primary coolant circuit of the plant. This liquid portion is diverted to chemical processing equipment for the purpose of removing corrosion and fission products therefrom and for injecting a chemical additive to maintain a proper pH level within the liquid. The system is also utilized to regulate primary coolant inventory by compensating for volumetric changes in the coolant caused by alterations in plant operation.

In most plants the chemical and volume control system includes heat exchange apparatus, termed the regenerative heat exchanger, that is effective to reduce the temperature of the diverted coolant prior to its admission to the chemical processing apparatus in order to enable the purification process to be conducted at reduced temperatures and to protect the ion exchange resin utilized therein against damage induced by excessive temperatures. In most plants this same heat exchanger is also utilized to apply heat to the processed coolant before it is reintroduced into the primary coolant circuit to maintain heat losses in the system to a minimum.

In utilizing the processed coolant from the chemcial and volume control system for seal injection purposes it has been the practice to extract a portion of the processed coolant from the return line to the primary coolant circuit at a point either upstream or downstream of the regenerative heat exchanger and to divert the same to the pump shaft seal system. However, due to the fact that the coolant flowing through the chemical and volume control system is subject to thermal transients it has been necessary, in order to protect the seal structure against adverse thermal instability, to regulate the temperature of the seal injection fluid prior to injecting it into the shaft seal system. This requirement has necessitated the imposition of additional heat transfer apparatus into the system. Where the injection fluid is removed from the chemical and volume control system upstream of the regenerative heat exchanger, the additional heat transfer surface is required to raise the injection fluid temperature to a predetermined level before admitting it to the seal system and, conversely, where the injection fluid is removed from a point downstream of the regenerative heat exchanger, the added surface is needed to lower its temperature below that which would oterwise damage the seals. In either case, the need for an additional heat exchanger in such systems adds significantly to the equipment costs of the plant.

SUMMARY OF THE INVENTION

According to the present invention there are provided in a pressurized water nuclear reactor coolant flow circuit incorporating a pump for circulating coolant through said circuit and a coolant flow processing system including a regenerative heat exchanger operative to increase the temperature of the processed coolant admitted to the coolant flow circuit, means for supplying high purity water to the shaft seal system of the pump. The supply means comprises means for extracting a portion of low temperature liquid from the coolant processing system upsteam of the regenerative heat exchanger; means for extracting a portion of the high temperature liquid from the coolant processing system downsteam of the regenerative heat exchanger; means for mixing the two extracted portions; and means for injecting the resultant mixture into the shaft seal system of the pump. Additional means are provided to regulate the proportional amounts of the two extracted portions in order to control the temperature of the resultant mixture.

It is accordingly an object of the present invention to provide an improved primary coolant pump shaft seal injection system for use in nuclear steam supply plants.

Another object of the invention is to provide an arrangement of the described type that is capable of delivering high purity shaft seal injection liquid to the primary coolant pump of a nuclear steam supply plant.

Still another object of the invention is to provide a coolant pump shaft seal injection liquid system in which the temperature of the injection liquid passed to the pump can be regulated within predetermined limits without need for ancillary heat exchange apparatus.

For a better understanding of the invention, its operating advantages and the specific objects obtained by its use, reference should be made to the accompanying drawings and description which relate to a preferred embodiment of the invention.

DESCRIPTION OF THE PREFERRED EMBODIMENT

Figure 1:
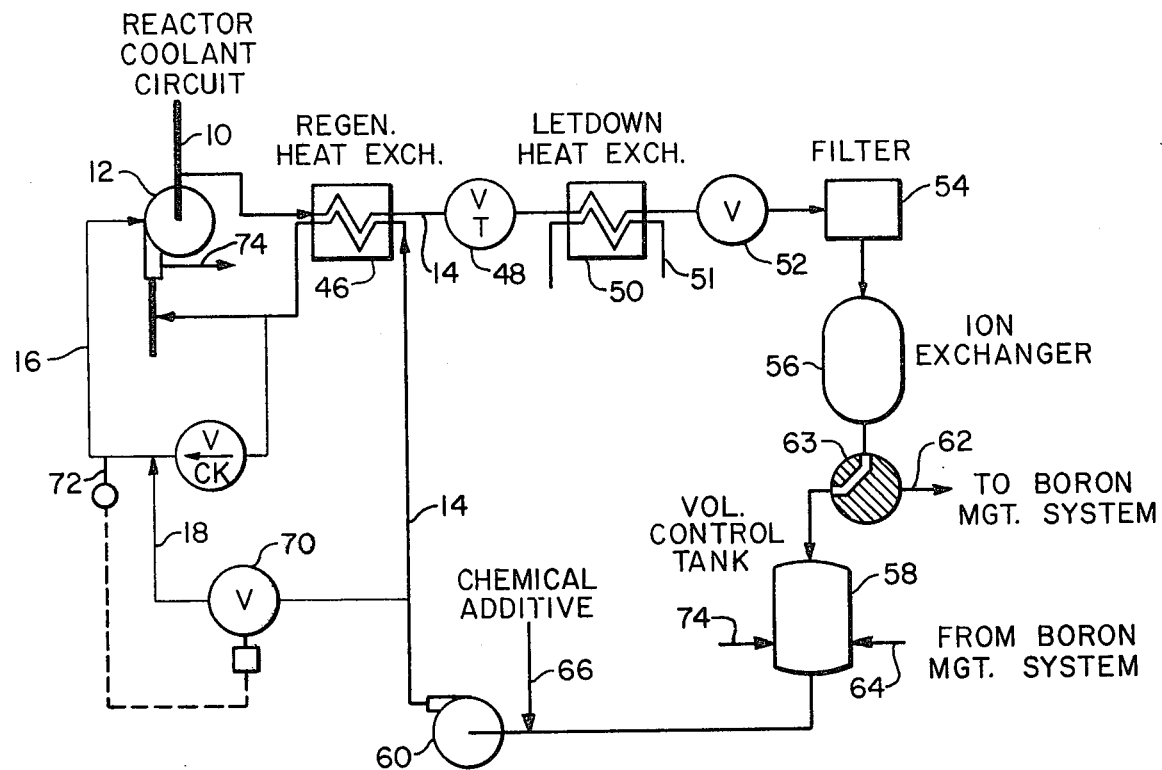
FIG. 1 is a schematic representation of a portion of the primary coolant circuit of a pressurized water nuclear steam supply plant including part of the chemical and volume control system and a pump shaft seal injection system according to the present invention.

In FIG. 1 of the drawing line 10 represents part of the primary coolant circuit of a pressurized water nuclear steam supply plant. A coolant pump 12 is interposed in ine 10 and operates to circulate primary coolant between the reactor and an associated steam generator, neither of which plant components are shown in the drawing. Line 14 forms part of the chemical and volume control system of the plant which is operative to continuously process the primary coolant as hereinafter more fully described. Lines 16 and 18 represent the operative parts of the coolant pump shaft seal injection system according to the invention.

In order to enhance an understanding of the description herein, different line weights are utilized in the illustration of the above enumerated lines which form the operative potions of the described arrangement. The line weights are not necessarily representative of the size of the piping embodied in the respective portions of the system but are intended only to facilitate the description herein.

Figure 2:
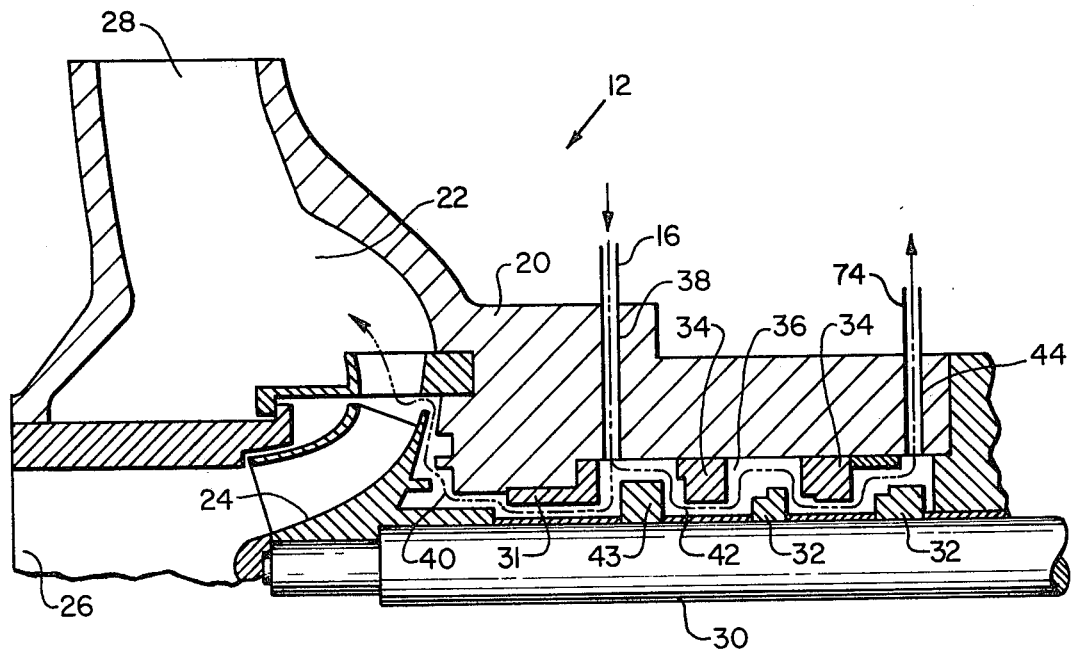
FIG. 2 is a fragmented, somewhat schematic partial elevational section of a coolant circulating pump intended for use in the arrangement of FIG. 1.

A coolant pump of the type with which the invention is intended for use is shown in FIG. 2. It comprises a housing 20 defining an enclosed chamber 22 having an impeller 24 operative therein for pressurizing coolant fluid admitted through axial inlet 26 and discharging through outlet 28. The impeller 24 is mounted for rotation upon shaft 30 which is journaled in the housing 20 by radial bearings one of which is shown at 31. A number of annular seal elements 32 are mounted at axially spaced points along shaft 30 and cooperate with mating structures 34 within the interior of the housing 20 to define an elongated labyrinthine passage 36 adapted to conduct pressurized seal injection fluid.

Seal injection fluid is admitted to the pump through one or more radial openings 38 provided in the housing 20 and which communicate with the passage 36. As is usual in shaft seal arrangements of the described type, the radial openings 38 communicate with the passage 36 intermediate its ends whereby the seal injection fluid admitted to the passage can be supplied into two, oppositely directed, streams indicated as 40 and 42 respectively, its flow being assisted by an internal pump 43. One end of the passage 36 is caused to communicate with the pump chamber 22 whereby stream 40, which contains the principal portion of the injection fluid, is discharged thereinto from whence it passes into the primary coolant circuit 10. At its other end, the passage 36 communicates with one or more radial openings, termed bleed ports 44, through which stream 42 is discharged from the pump 12 and conducted back to the chemical and volume control system.

Referring now to the chemical and volume control system illustrated in FIG. 1, line 14 is a substantially closed loop which communicates with the reactor coolant circuit 10 upstream of the coolant pump 12 and operates to remove a small portion of fluid from the coolant circuit, to conduct the same through the various processing apparatus in the loop and to thereafter return the processed fluid to the reactor coolant circuit 10 at a point downstream of the pump. The portion of line 14 through which the coolant flow is diverted from the reactor coolant circuit is referred to as the letdown line 14a. The portion of line 14 through which the coolant is passed following treatment in the coolant processing system and passage through the charging pump 60 is referred to as the charging line 14b. The diverted coolant, in flowing through line 14, is caused to pass serially through regenerative heat exchanger 46, throttle valve 48, letdown heat exchanger 50, back pressure valve 52, filter 54, ion exchanger 56 and volume control tank 58. A charging pump 60 is interposed in the line downstream of the volume control tank 58 for boosting the fluid pressure of the coolant prior to passing it, via the charging line 14b, again through regenerative heat exchanger 46 and reinjecting it into the reactor coolant circuit 10. The regenerative heat exchanger 46 operates to cool the diverted coolant by passing it in indirect heat transfer relation with the lower temperature fluid returning through charging line 14b to the primary coolant circuit. Throttle valve 48 is employed to reduce the pressure of the fluid and letdown heat exchanger 50 serves to further reduce the temperature of the diverted fluid. In the latter apparatus low temperature plant component cooling water conducted through line 51 is utilized as the cooling medium. This reduction in temperature and pressure imparted to the diverted coolant is required prior to admitting the same to the ion exchanger 56 so as to prevent harm to the resins utilized therein.

Back pressure valve 52 is imposed in line 14 to control the line pressure between the throttle valve 48 and the letdown heat exchanger 50 in order to prevent flashing of the diverted coolant in this section of the system. Filter 54 serves to remove particulate matter from the coolant prior to its admission to the ion exchanger 56 wherein boron-saturated, mixed-bed resins are utilized for the removal of corrosion and fission products from the coolant. Thereafter, the liquid is sprayed into volume control tank 58 where hydrogen gas can be absorbed.

As shown, lines 62 and 64 may be provided in the chemical and volume control system for circulating a portion of the coolant to a boron management subsystem (not shown) by means of which the boron concentration of the coolant can be adjusted in response to changes in the operating characteristics of the plant. A three-way valve 63 is interposed at the intersection of lines 14 and 62 is effective to selectively direct coolant from the line 14 to the boron management system. Line 64 conducts makeup liquid containing a prescribed amount of boron additive to the volume control tank 58 thereby to maintain a proper boron concentration in the fluid flowing in the reactor coolant circuit 10. Means represented by line 66 communicating with line 14 downstream of the volume control tank 58 may also be provided for the controlled injection of chemical additives, such as lithium hydroxide, or the like to regulate the pH of the coolant fluid.

According to the invention liquid supply is provided for the shaft seal injection system of the coolant pump 12 by a first line 16 connected between charging line 14b of the chemical and volume control system and the inlet opening 38 in the pump housing 20. The line 16 is adapted to conduct processed liquid coolant at an elevated temperature, its having been heated in the regenerative heat exchanger 46. A check valve 68 in this line prevents retrograde flow of liquid therethrough. Line 18 connects between the charging line 14 and line 16, communication being made with the former at a point upstream of the regenerative heat exchanger whereby line 18 is caused to conduct processed coolant lquid at a significantly lower temperature than that flowing through line 16. Thus, liquid from line 18, in mixing with the higher temperature liquid in line 16, is effective to temper the same in order to protect the sensitive components in the pump 12. Automatic flow regulating valve 70 in line 18 operates to control the admission of the cooler tempering lquid into line 16 in response to the temperature of the mixed lquid therein as determined by temperature sensor 72.

The operation of the hereindescribed arrangement is as follows. The chemical and volume control system represented by line 14 and the various apparatus therein is effective to continuously purify a diverted fractional part of the fluid flowing in the reactor coolant circuit 10 to maintain established coolant purity and chemistry standards. The diverted stream of coolant fluid removed through letdown line 14a and is cooled by the heat transfer occurring in the regenerative heat exchanger 46 and letdown heat exchanger 50 and its fluid pressure is reduced by the throttling effected by valve 48. These functions serve to protect the resins in the ion exchanger 56 and to allow the coolant processing to occur at lower and safer temperatures and pressures.

Following teh purification procedures effected by the filter 54 and ion exchanger 56, the liquid flowing through the remainder of the chemical and volume control system is passed to the volume control tank 58, either directly from the ion exchanger or indirectly by way of the boron management system. The coolant liquid, after discharge from the tank 58, is pressurized by charging pump 60 to a pressure sufficient to permit recharging into the reactor coolant circuit 10 through charging line 14b. Prior to its return to circuit 10 the coolant is passed through the regenerative heat exchanger 46 in indirect heat transfer relation to the unprocessed coolant fluid conducted therethrough to recover part of the heat lost in the chemical and volume control system. The coolant flow in the charging line 14 b, downstream of the regenerative heat exchanger 46 is divided into two portions, with one continuing on through line 14b for recharging into the coolant circuit 10 while the other is conducted by means of line 16 to the coolant pump 12 for insertion into the shaft seal injection system therein. The coolant which is inserted into the shaft seal injection system is controllably regulated to avoid excessive thermal transients and to maintain its temperature within acceptable limits in order to prevent damage to the pump seal elements 32, 34 and other temperature sensitive components therewithin. Control is effected by the regulated addition of low temperature processed coolant which is conducted through line 18 in amounts controlled by valve 70.

The shaft seal injection liquid supplied to the pump 12 through inlet opening 38 is divided into two oppositely directed streams in flowing through internal passage 36. One stream 40, which may contain the principal part of the total flow of injection liquid, is directed through the passage 36, discharging into the pump chamber 22 for ultimate retun to the primary coolant circuit 10. The other stream 42 is conducted oppositely through passage 36 along the pump shaft 30 and exits the pump interior through bleed port 44 from whence it is conducted by line 74 back to the volume control tank 58 of the chemical and volume control system.

It will be appreciated that the hereindescribed arrangement, in utilizing processed coolant liquid from the chemical and volume control system advantageously assures the delivery of high purity liquid of proper chemical composition for cooling and cleansing purposes in the shaft seal injection system of coolant pumps in nuclear steam supply plants. Moreover, the present invention improves upon similar prior art arrangements in which seal injection liquid is taken from the chemical and volume control system either upstream or downstream of the regenerative heat exchanger and thereby requires an added heat exchanger in order to regulate the temperature of the liquid delivered to the system. By extracting shaft seal injection liquid in controlled amounts from both sides of the regenerative heat exchanger in the chemical and volume control system as taught herein, regulation of the liquid temperature can be expeditiously effected without the need for ancillary heat transfer surface.

While the preferred embodiment of the present invention has been described herein, it should be understood that the description is merely illustrative and that variations and modifications can be made therein without departing from the spirit and scope of the invention. What is sought to be protected herein is as recited in the appended claims.

What is claimed is:

1. In a pressurized water nuclear reactor coolant flow circuit incorporating a pump for circulating coolant through said circuit and a coolant processing system for processing a flow of coolant removed from said coolant flow circuit and readmitting the processed flow to said coolant flow circuit including a charging line for conveying the processed coolant to be readmitted to the coolant flow circuit and a regenerative heat exchanger operative to increase the temperature of the processed coolant in the charging line prior to readmission to said coolant flow circuit, the invention comprising means for supplying high purity coolant to the shaft seal system of said coolant pump, said means including:
    a. means for extracting low temperature processed coolant from said charging line upstream of said regenerative heat exchanger;
    b. means for extracting high temperature processed coolant from said charging line downstream of said regenerative heat exchanger;
    c. means for mixing said low temperature coolant with said high temperature coolant; and
    d. means for injecting the resultant mixture into said coolant pump shaft seal system.

2. Apparatus as recited in claim 1 including means for regulating the proprotionate amounts of low and high temperature coolant to be mixed in response to the temperature of the resulant mixture.

3. Apparatus as recited in claim 2 wherein said regulating means comprises a flow regulating valve for controlling the flow of low temperature coolant extracted from said coolant processing system.

4. Apparatus as recited in claim 2 wherein said regulating means includes means for maintaining the temperature of the resultant mixture substantially constant.

* * * * *